March 4, 1969     E. NIELD     3,431,276
PROCESS FOR PRODUCING IMIDE DERIVATIVES
Filed May 16, 1966
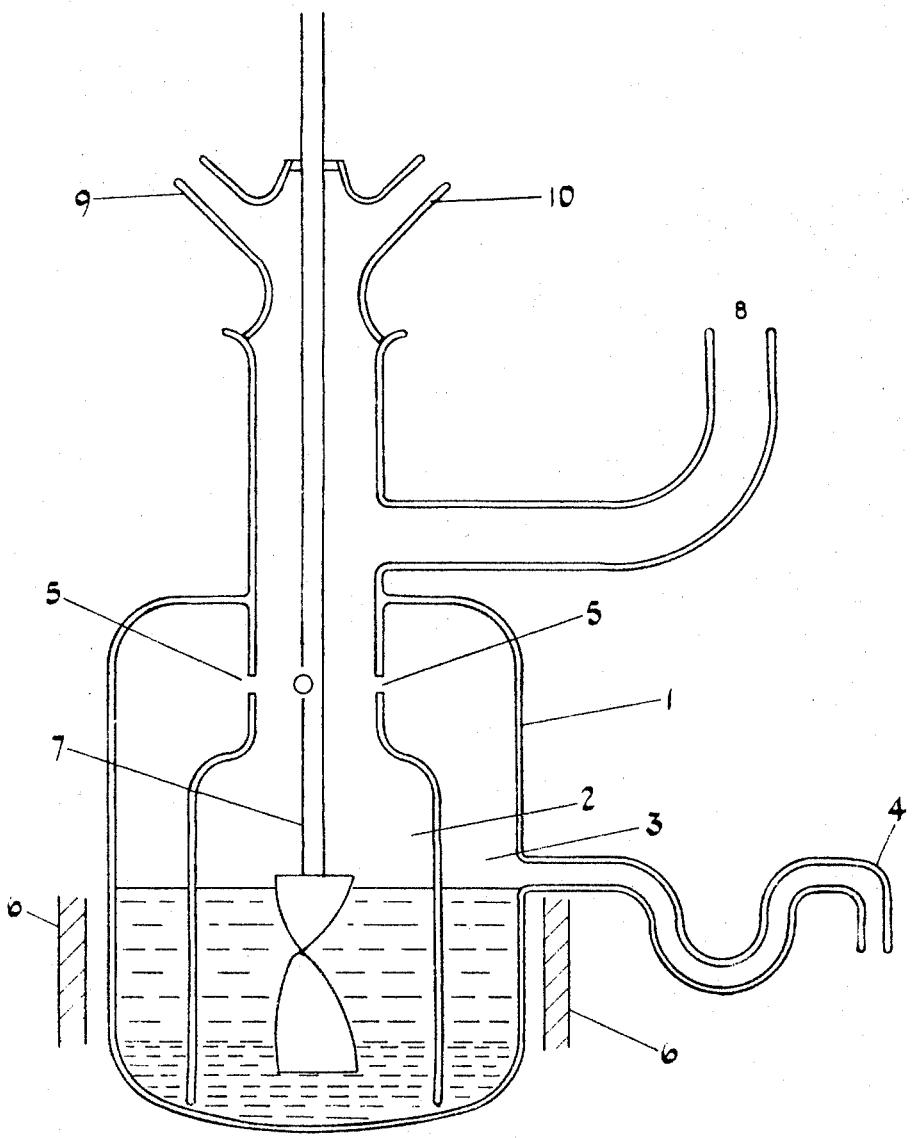
INVENTOR
ERIC NIELD

# United States Patent Office 3,431,276
Patented Mar. 4, 1969

3,431,276
PROCESS FOR PRODUCING IMIDE DERIVATIVES
Eric Nield, Ware, England, assignor to Imperial Chemical Industries Limited, London, England, a corporation of Great Britain
Continuation-in-part of application Ser. No. 404,968, Oct. 19, 1964. This application May 16, 1966, Ser. No. 550,362
Claims priority, application Great Britain, Oct. 25, 1963, 42,231/63, 42,232/63; May 26, 1965, 22,401/65; Dec. 20, 1965, 53,826/65
U.S. Cl. 260—326.5
Int. Cl. C07d 27/18, 27/16

7 Claims

ABSTRACT OF THE DISCLOSURE

Imides are produced from anhydrides of alpha, beta-ethylenically unsaturated cis alpha, beta dicarboxylic acids by reaction of the anhydride with an amine and cyclizing the formed amic acid in the presence of an acid catalyst containing sulfur or phosphorous.

---

The present invention is a continuation-in-part of my copending application Serial No. 404,968, filed October 19, 1964, now Patent No. 3,338,919, and relates to the cyclisation of $\alpha,\beta$-amic acids and their mono N-substituted derivatives to yield imides, and more particularly to the cyclisation of the amic acid derivatives of $\alpha,\beta$-ethylenically unsaturated cis-$\alpha,\beta$-dicarboxylic acids with the loss of a molecule of water to yield imides of $\alpha,\beta$-ethylenically unsaturated $\alpha,\beta$-dicarboxylic acids.

$\alpha,\beta$-amic acids and their mono N-substituted derivatives which are capable of cyclisation to imides with the loss of a molecule of water are compounds which have (i) a carboxy group and (ii) either a primary carbamoyl or a secondary carbamoyl group, attached to vicinal carbon atoms. Alternatively, they may be regarded as 3-carboxy derivatives of primary or secondary amides. The cyclisation of such compounds to form imides is well known and the reaction is generally effected simply by heating or by vacuum distillation. However, if the conditions normally used for cyclisation are applied to those compounds in which the vicinal carbon atoms are linked by a double bond (that is, $\alpha,\beta$-ethylenically unsaturated cis-$\alpha,\beta$-amic acids and their mono N-substituted derivatives, which can be regarded alternatively as the 3-carboxy derivatives of 2,3-ethylenically unsaturated primary or secondary amides), the yields of imide are impaired because of secondary reactions involving the double bond. Efforts to avoid such secondary reactions have led to cyclisation processes under less forcing conditions and in the presence of compounds known to react with water. For example, the cyclisation of N-substituted maleamic acids has been effected in the presence of such dehydrating agents as dicyclohexylcarbodiimide and acetic anhydride. These processes require the presence of the dehydrating agent in an amount at least equimolar with the amic acid and it is frequently preferred to use up to four moles or more of the dehydrating agent per mole of amic acid. The processes are therefore clumsy and expensive to operate.

It is an object of the present invention to provide a process for the cyclisation of $\alpha,\beta$-ethylenically unsaturated cis-$\alpha,\beta$-amic acids and their mono N-substituted derivatives which avoids the use of large quantities of dehydrating agent.

Accordingly, we provide a process for the cyclisation of an $\alpha,\beta$-ethylenically unsaturated cis-$\alpha,\beta$-amic acid which is free of atomic groups which are basic in character, or a mono N-substituted derivative thereof in which the substituent is non-basic in character and is linked to the nitrogen atom through a carbon atom, in which it is contacted at a temperature of from 80° C. to 200° C. with an acidic catalyst selected from sulphur trioxide, sulphuric acid, chlorosulphonic acid, polyphosphoric acids, pyrophosphoric acid, phosphorus acids having the structure HOPO, $HOPO_2$, $(HO)_3P$, $(HO)_3PO$, $HP(OH)_2$, $HPO(OH)_2$, $H_2POH$ and $H_2PO.OH$, organic sulpohnic acids and organo-phosphorus acids, the amount of catalyst employed being 0.01% to 20% of the weight of the aggregate amount of the amic acid employed, and the water formed by the reaction is distilled off from the reaction mixture during the cyclisation process. By the term "organio-phosphorus acids" we mean acids having the structure $HP(OH)_2$ or $HPO(OH)_2$, in which the hydrogen atom bound to the phosphorus atom has been replaced by a monovalent organic radical (i.e. organo-phosphonous acids and organo-phosphonic acids) and acids having the structure $H_2POH$ or $H_2PO.OH$ in which at least one of the hydrogen atoms bound to the phosphorus atom has been replaced by a monovalent organic radical (i.e. organo-phosphinous and organo-phosphinic acids).

By an atomic group which is basic in character we mean one which is a proton acceptor according to Bronsted (e.g. an amino group) and, conversely, by a substituent which is non-basic in character we mean one that is not a proton acceptor according to Bronsted.

The amic acids and their derivatives

The part of an $\alpha,\beta$-ethylenically unsaturated cis-$\alpha,\beta$-amic acid which is active in the cyclisation reaction has the structure

$$\begin{array}{l}-\mathrm{C-CONH_2}\\ \parallel \\ -\mathrm{C-COOH}\end{array} \qquad (1)$$

The nature of the groups satisfying the remaining two valencies on the carbon atoms is immaterial to the success of the cyclisation reaction provided it does not destroy the catalyst but it may affect the rate of cyclisation, e.g. by causing steric hindrance or by reducing or increasing the reactivity of the amido hydrogen atoms or the carboxylic hydroxyl group. Thus, while the invention is applicable in general to all $\alpha,\beta$-ethylenically unsaturated cis-$\alpha,\beta$-amic acids which are free of atomic groups which are basic in character, the better results are obtained generally from those in which the atoms or groups which satisfy the remaining valencies are limited to hydrogen atoms, halogen atoms (e.g. fluorine, chlorine, bromine, iodine) and alkyl groups containing from 1 to 4 carbon atoms (methyl, ethyl, propyl, isopropyl, butyl, isobutyl and t-butyl). The simplest member of the class of $\alpha,\beta$-ethylenically unsaturated cis-$\alpha,\beta$-amic acids is maleamic acid ($H_2NOC.CH=CH.COOH$) and this and its N-substituted derivatives are used throughout the specification to illustrate the process of our invention. However, it should be understood that the process of this invention is not limited to the cyclisation of such compounds alone but, as stated hereinbefore, is applicable in general to any amic acid which contains the structure 1 and is free of groups which are basic in character and to any of its N-substituted derivatives in which the substituent is non-basic in character.

Notionally, the cyclisation of the amic acid or its mono-N-substituted derivative involves the combination of an amido hydrogen atom with the hydroxyl group of the carboxylic acid group which together split off to form a molecule of water and the linking of the carboxylic carbon atom to the amido nitrogen atom to yield an imide. The nature of the substituent of the non N-substituted amic acid may affect the rate of reaction or may promote competitive secondary reactions but it is immaterial to the success of the cyclisation so long as it does not destroy the acidic compound catalysing the reaction. Thus, any substituent which is non-basic in character may be tolerated. Examples are:

(1) Monovalent aliphatic groups such as alkyl, cycloalkyl and alkenyl, e.g. methyl, ethyl, n-propyl, isopropyl, n-butyl, isobutyl, n-hexyl, cyclohexyl, n-octyl, 2-ethylhexyl, n-decyl, n-dodecyl, n-octadecyl, eicosyl and allyl;

(2) Substituted derivatives of monovalent aliphatic groups such as chloromethyl, bromomethyl, 4-chlorobutyl, cyanoethyl, esters of hydroxymethyl such as the acetate, propionate, benzoate, n-butyrate and monoester of succinic acid, hydroxyethyl and esters thereof such as the half ester of succinic acid, benzyl, o-chlorophenoxyethyl, 2-ethoxyethyl, 2-thiomethylethyl, phenylethyl, phenoxyethyl, p-nitrophenoxyethyl, 2-nitrocyclohexylmethyl, 3,5-di-t-butyl-4-hydroxycyclohexylmethyl, and derivatives having the structure $$-CH_2O.CO.CH=CHCH_3, \quad -CH_2OCH_2CH=CH_2$$

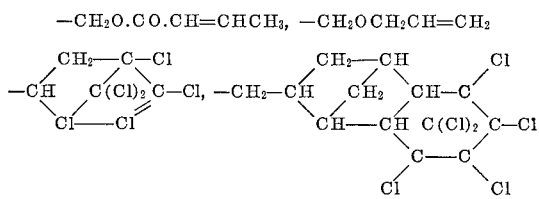

and

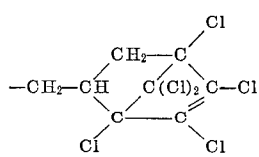

(3) Monovalent aryl and alkaryl radicals, e.g. phenyl, -o-tolyl, m-tolyl, p-tolyl, o-biphenylyl, p-biphenylyl, p-(t-butyl) phenyl, p-dodecylphenyl, o-vinylphenyl, 2,4-dimethylphenyl, 2,6-dimethylphenyl, 4-cyclohexylphenyl, α-naphthyl, β-naphthyl, 1-fluorenyl, 2-fluorenyl, 3-fluorenyl and 4-fluorenyl and (4) Substituted derivatives of monovalent aryl and alkaryl radicals, e.g.

m-chlorophenyl,
o-chlorophenyl,
p-chlorophenyl,
p-acetamidophenyl,
o-methoxyphenyl,
p-methoxyphenyl,
p-ethoxyphenyl,
o-nitrophenyl,
m-nitrophenyl,
p-nitrophenyl,
o-hydroxyphenyl,
p-hydroxyphenyl,
p-acetoxyphenyl,
p-carboxyphenyl,
p-sulphophenyl,
p-acetylphenyl,
2,5-dichlorophenyl,
2,5-diamethoxyphenyl,
2,4-dinitrophenyl,
3,5-dinitrophenyl,
2-nitro-4-chlorophenyl,
2-nitro-4-ethoxyphenyl,
3-nitro-4-methylphenyl,
2-methyl-5-nitrophenyl,
2-methyl-4-chlorophenyl,
2-methoxy-5-chlorophenyl,
2-methoxy-5-nitrophenyl,
4-phenoxyphenyl,
4-phenylcarboxyphenyl,
4-phenylsulphodioxyphenyl,
4-(o-chlorophenoxy)phenyl,
2,4,5-trichlorophenyl,
1-(9-oxofluoroenyl),
2-(7-bromofluorenyl),
2-(bromofluoroenyl),
2-(7-fluorofluorenyl),
2-(7-nitrofluorenyl),
2-(3-bromo-9-oxofluorenyl),
2-(9-acetoxyfluorenyl),
2-(9-oxofluorenyl),
3-(9-oxofluorenyl), and
4-(9-oxofluorenyl).

However, the substituent on the amido nitrogen atom may affect the ease with which cyclisation is accomplished, e.g. by steric hindrance or by activation or de-activation of the amido hydrogen atom or may encourage secondary reactions and we prefer the N-substituted amic acids in which the substituent contains not more than 14 carbon atoms in all and is a saturated monovalent hydrocarbon group (e.g. alkyl, cycloalkyl, aralkyl, aryl or alkaryl) or a substituted derivative thereof in which the aliphatic hydrogen atoms may be replaced only by halogen atoms or groups of the structure —CN, —OH and —OQ and/or the aromatic hydrogen atoms may be replaced only by halogen atoms or monovalent groups having the structure —NO₂, —OH, —OQ, —CN, —SQ, —COQ, —SO₂Q, —COOQ, —COOH and —OCOQ where Q is a monovalent hydrocarbon radical or a derivative thereof in which the aliphatic hydrogen atoms may be replaced only by halogen atoms and/or the aromatic hydrogen atoms may be replaced only by halogen atoms or nitro groups.

It will be appreciated that with some mono N-substituted amic acids, the nature of the substituent may be modified during the cyclisation reaction so that the amide obtained is not the exact counterpart of the acid from which it was derived. For example, the substituent may contain an acid-labile group which is lost or modified during the cyclisation.

The catalysts

Where sulphur trioxide is the chosen catalyst, it may be used alone or admixed with an organic solvent, particularly a normally liquid aromatic hydrocarbon such as benzene, toluene or a xylene.

Any organic sulphonic or organo-phosphorus acid may be used as a catalyst for our cyclisation process. The organic sulphonic acids have the structure RSO₃H and the organo-phosphorus acids have the structure RP(OH)₂, RPO.(OH)₂, HRPOH, RR'POH, HRPO.OH or

RR'PO.OH where R and R' are monovalent organic radicals. They are linked by a carbon atom to the sulphur or phosphorus atom respectively. Examples of such organic sulphonic acids and organo-phosphorus acids may be found on pages 465 to 492 of "Pure and Applied Chemistry," volume 1, 1960–61.

We have found in general that the activity of the organic acid in promoting our cyclisation reaction is directly related to its acidity; that is, efficiency has been found to vary inversely with $pK_a$ value although this may not apply for very low $pK_a$ values, when reactions involving the double bond may occur to an increasing extent. Therefore, we prefer on the whole to use acids that are incapable of existing as zwitter ions, thus excluding acids having basic nitrogen atoms such as aminoalkyl-, aminoaryl-, pyridine- and quinoline-sulphonic acids and their organo-phosphorus equivalents.

Organic sulphonic and organo-phosphorus acids that are particularly effective are generally found amongst those in which R and R' are each selected from alkyl or cycloalkyl radicals containing up to about eight carbons (preferably unbranched) or derivatives thereof in which the only substituents are halogen atoms, hydroxyl groups or $C_{1-4}$ alkoxy groups or aryl, aralkyl, alkaryl or quinone groups having up to 14 carbon atoms or substituted derivatives thereof in which the only substituents (if any) for the aliphatically bound hydrogen atoms are halogen atoms, hydroxyl groups or $C_{1-4}$ alkoxy groups and the only substituents (if any) for the aromatically bound hydrogen atoms are halogen atoms (particularly fluorine and chlorine atoms) and groups having the structure —OH, —NO₂, —CN, —SH, SR″, —OR″, —CHO, —COR″, —SO₂R″, —CF₃, —CCl₃ or —COOH where R″ is a monovalent (i.e. alkyl, cycloalkyl, aryl, aralkyl or alkaryl) hydrocarbon radical. In general, R and R′ each contain not more than 16 carbon atoms.

Particular examples of such acids are alkyl (including cycloalkyl) sulphonic acids (e.g. methyl, ethyl, propyl, n-butyl, n-hexyl, cyclohexyl and methylcyclohexyl sulphonic acids); aryl sulphonic acids (e.g. benzene, naphthalene, anthracene, phenanthrene, pyrene and fluorine sulphonic acids); alkaryl sulphonic acids such as p-toluene sulphonic acid, aralkyl sulphonic acids such as benzyl sulphonic acid and sulphonic acid derivatives of substituted hydrocarbons such as m- and p-hydroxyphenyl sulphonic acids anthraquinone-1-sulphonic acid, anthraquinone-2-sulphonic acid, alizarin-3-sulphonic acid and chloromethyl sulphonic acid; methyl, ethyl, n-propyl, isopropyl, n-butyl, n-butyl-2-, isobutyl, t-butyl, neopentyl, t-amyl, n-hexyl, chloromethyl, dichloromethyl, trichloromethyl, bromomethyl, iodomethyl, hydroxymethyl, phenyl, o-tolyl, m-tolyl, p-tolyl, o-fluorophenyl, o-, m- and p-chlorophenyl, o-, m- and p-bromophenyl, o-iodophenyl, m-hydroxyphenyl, p-hydroxyphenyl, o- and p-methoxyphenyl, p-ethoxyphenyl, m- and p-nitrophenyl, 2-bromo-p-tolyl, benzoic acid-2-, benzoic acid-3-, benzoic acid-4-, 3-chloro-4-methoxyphenyl, 2-chlor-4-nitrophenyl, 2-hydroxy-4-nitrophenyl and 2-methoxy-4-nitrophenyl phosphonic acids; methyl, ethyl, n-propyl, isopropyl, n-butyl, phenyl, p-bromophenyl and p-methoxyphenyl phosphinic acids; dimethyl and diphenyl phosphinic acids and their phosphonous and phosphinous acid equivalents. In general, we have found that the organo-phosphorus acids may be less likely than their organo-sulphonic acid equivalents to promote secondary reactions involving the double bond of the amic acid.

We prefer the catalyst to be substantially involatile at the temperature of the reaction (generally from 80° C. to 160° C.) and examples of these may be established with reference to standard handbooks on the physical constants of organic compounds or by experiment. Particular examples are sulphuric acid, and aromatic sulphonic, aromatic phosphonic and aromatic phosphinic acids in general. The inorganic phosphorus acids may be preferred in a continuous process.

The use of less than 0.01% of catalyst (based on the weight of amic acid or derivative) generally has an insignificant effect on the reaction but the use of more than 20% is uneconomical. In the preferred process, which takes place with the amic acid or its derivative dissolved or dispersed in an inert organic diluent, satisfactory results are obtained with the use of catalyst amounts equivalent to 0.1 to 5% by weight of the diluent.

Where the catalyst is sulphur trioxide, sulphuric acid or an organic sulphonic acid, we have found that its activity may be increased by the addition of an aliphatic alcohol generally in an amount of up to about ten times the weight of the acid catalyst. The effectiveness of the alcohol is in general proportional to the readiness with which it may be esterified and therefore we prefer those having the hydroxyl group on a carbon atom having a chain of no more than three carbon atoms attached thereto, e.g. methanol, ethanol, n-propanol, isopropanol, isobutanol, t-butanol and 1,1-diethylethanol.

The process

The process may be effected simply by heating the amic acid or the N-substituted derivative with the catalyst to a temperature of from 80° C. to 200° C. Below 80° C., the reaction is uneconomically slow even with the use of very efficient catalysts and above 200° C., the cyclisation is shadowed by undesirable secondary reactions. However, cyclisation in the absence of a diluent frequently leads to local overheating and undesirable resin formation which is particularly noticeable in the case of the N-substituted derivatives of maleamic acid. Therefore, according to a preferred embodiment of the invention, the reaction is effected with the amic acid or the N-substituted derivative dissolved or suspended in an inert diluent, most preferably under reflux. This process is particularly suitable when the diluent is that used in the prior formation of the amic acid or the N-substituted derivative by reacting the corresponding anhydride in solution with ammonia or a primary amine, since it obviates the need for separating and purifying the product of that reaction. Very good results are obtained if a diluent having a boiling point above 80° C. is used and the water formed on cyclisation is removed by distillation with the diluent.

Any inert organic diluent having a boiling point above 80° C. may be used and by an inert diluent we mean one which has no noticeably adverse effect upon the reaction. Examples are benzene, toluene, the xylenes, sinarol, petroleum fractions boiling in the range 100 to 180° C., petroleum ether 100°–120°, petroleum ether 120°–160°, cholorobenzene, di-n-butyl ether, methyl, isobutyl ketone, tetrachloroethane and benzene/toluene mixtures. In general, the process increases in efficiency with increase in boiling point of the diluent but insoluble by-products tend to be produced in increasing yields at the higher temperatures and therefore diluents having a boiling point of less than 200° C., preferably less than 180° C. should be used. Some diluents, for example aromatic hydrocarbons such as xylene, can be used although they may undergo reaction with sulphur trioxide, sulphuric acid or chlorosulphonic acid when these are present as catalysts, because the product of this reaction is an aromatic sulphonic acid which itself can act as a catalyst. The ultimate choice of diluent depends to some extent upon the nature of the amic acid or the N-substituted derivative since the optimum temperature for the cyclisation reaction varies from compound to compound. The best reaction conditions for cyclising a given compound may be found by simple experiment.

The amount of diluent chosen depends to some extent upon its nature but on the whole the use of an amount less in weight than the weight of amic acid or N-substituted derivative should be avoided because little advantage is gained over the process operated in the absence of diluent. On the other hand, large excesses of diluent should be avoided for economic reasons. On the whole, very suitable amounts range from 2 to 5 times the weight of the amic acid or N-substituted derivative.

In a preferred process, a diluent is chosen which is immiscible with water and the distillate is separated into aqueous and non-aqueous phases, the latter being recycled to the reaction vessel if desired. This variant of the process reduces the consumption of expensive diluent and, quite unexpectedly, frequently leads to higher yields of imide.

In a particularly preferred process, only part of the amic acid or its derivative is added at the start of the reaction, the remainder being added continuously or in portions during the course of the reaction. This also results in improved yields of imide, and less insoluble by-products.

The N-substituted derivative of the amic acid may be prepared by a process wherein the anhydride of an $\alpha,\beta$-ethylenically unsaturated cis-$\alpha,\beta$-dicarboxylic acid which is free from atomic groups which are basic in character is treated with a primary amine of the structure Z-NH₂, where Z is linked to the amino nitrogen atom by a carbon atom and is non-basic in character, in the presence of an inert organic diluent.

Preferably the cyclisation is also effected in the presence of at least 100% by weight of the amic acid of an inert organic diluent having a boiling point between 80 and 180° C., the water formed on cyclisation being removed by distillation with the diluent, which is then separated from the water and returned to the reaction vessel. The reaction can then be carried out in the same diluent from the acid anhydride and the primary amine to the N-substituted imide without isolating the N-substituted amic acid.

It has now been found that the desired N-substituted imide can be produced in better yield with less insoluble or non-volatile by-products if the cyclisation of the N-substituted amic acid is concurrent with its formation. According to the invention the primary amine is added to the reaction mixture at approximately the rate (mole for mole) that the water produced in the cyclisation is distilled off, until a quantity approximately equivalent to the quantity of anhydride (mole for mole) has been added.

The reaction may also be carried out as a process in which the acid anhydride and the primary amine are each added to the reaction mixture at approximately the rate (mole for mole) that the water produced in the cyclisation is distilled off.

The rate at which these additions should be made may be determined by initially adding a small quantity of the reagent (or of each reagent if both are being added) to the catalyst-containing reaction medium. The amounts of acid anhydride and primary amine added initially are preferably less than 0.2 mole of each per $dm.^3$ of the reaction mixture so that the concentration of the N-substituted amic acid throughout the reaction is less than about 0.2 molar.

The process is essentially continuous when both the amine and acid anhydride are added to the reaction mixture as the water is distilled off. The imide solution produced can be withdrawn from the reaction chamber as fresh diluent is added to the reaction mixture with the reactants. If a soluble catalyst is used (for example most of the sulphur-containing acids and the organo-phosphorus acids), it needs also to be added continuously to the reaction mixture at the rate required to maintain its concentration in the reaction mixture approximately constant if the liquid reaction product is being continuously withdrawn. A catalyst insoluble in the reaction medium, for example an inorganic phosphorus-containing acid, is therefore preferred for a continuous process as it can be left in the reaction vessel. Although this process is essentially continuous, with short runs of reagents a batch process may be simulated.

At the end of the reaction, the imide or N-substituted imide formed by cyclisation may be recovered by any suitable process, such as crystallisation, precipitation or distillation. It may then be purified, for instance by washing and crystallisation from a suitable solvent or by fractional distillation.

As has been stated above, the invention is particularly applicable to the preparation of N-substituted maleimides.

These compounds, and particularly the N-aryl maleimides, are useful in the manufacture of thermoplastic materials. When it is the intention to form these compounds, it may be preferred to effect the reaction in the presence of a free radical inhibitor in order to ensure that little or no resin formation occurs. Suitable inhibitors are copper salts, such as cuprous chloride.

The invention is illustrated by the following examples.

Examples 1 to 16

Fifty parts of N-o-chlorophenyl maleamic acid and 215 parts of xylene were heated and stirred under reflux in a Dean-Stark distillation apparatus for 6½ hours. At the end of this period, one part (about 25% of theoretical) of water had collected. The hot mixture was filtered and excess 40–60 petroleum ether added to the cooled filtrate. The precipitate was found to contain a very small amount of N-o-chlorophenyl maleimide and a large proportion of unreacted N-o-chlorophenyl maleamic acid.

The process of Example 1 was then repeated a number of times using in each case 25 parts of N-o-chlorophenyl maleamic acid in a selected diluent. Each process was aided by the presence of a catalyst identified in the table below which also shows the duration of the reaction and the yield of water. After heating, the mixture was filtered to remove the insoluble by-products and then excess 40–60 petroleum ether was added to the cooled filtrate. The precipitate so formed was removed, washed and dried to yield the imide.

The yield, melting point and purity of N-o-chlorophenyl maleimide are tabulated below. (Pure N-o-chlorophenyl maleimide has a melting point of 74–75° C.).

In the table:
Diluent 1 is toluene (108 parts).
Diluent 2 is xylene (108 parts).
Diluent 3 is chlorobenzene (125 parts).
Diluent 4 is toluene/benzene mixture, boiling point 99° C. (110 parts).
Diluent 5 is toluene/benzene mixture, boiling point 91° C. (110 parts).

| Exp. | Diluent | Catalyst and amount | Reaction duration, hours | Yield of water (parts) | Yield of by-product (parts) | N-o-chlorophenyl maleimide | | |
|---|---|---|---|---|---|---|---|---|
| | | | | | | Yield (parts) | M.P., ° C. | Impurities, percent |
| 2 | | | | | | | | |
| 3 | 1 | p-Toluene sulphonic acid 2 parts | 1 | 1.5 | 3.5 | 17.6 | 65–67 | 15 |
| 4 | 1 | p-Toluene sulphonic acid 1 part | 2 | 1.5 | 4.7 | 18.1 | 62–65 | 5 |
| 5 | 2 | ---do--- | 1 | 1.5 | 4.6 | 16 | 63–65 | 5 |
| 6 | 3 | ---do--- | 1½ | 1.3 | 3.3 | 18.4 | 62–63 | 10–20 |
| 7 | 4 | ---do--- | 2½ | 1.5 | 5.6 | 16.7 | 62–65.6 | <5 |
| 8 | 5 | ---do--- | 7¾ | 1.25 | 6.4 | 15.5 | 62–65.5 | <5 |
| 9 | 1 | p-Toluene sulphonic acid 1 part, butanol 4 parts | 2¾ | 1.7 | 3.3 | 18.1 | 58.5–60 | (¹) |
| 1 | 1 | p-Toluene sulphonic acid 1 part, ethanol 3.95 parts | 6 | (¹) | 1.0 | 21.4 | 61–63 | 5 |
| 10 | 1 | Benzene phosphonic acid 1 part | 3 | 1.15 | 2.6 | 15 | | 15 |
| 11 | 2 | ---do--- | 2¼ | 1.3 | 2.7 | 17 | | 15 |
| 12 | 1 | Methyl p-toluene sulphonate 1 part | 6¾ | 1.5 | 3.6 | 19 | 52–55 | (¹) |
| 13 | 1 | Conc. sulphuric acid 1 part | 2 | 1.5 | 4.5 | 15.2 | 63–65 | 5 |
| 4 | 1 | Conc. sulphuric acid 1 part, ethanol 11.8 parts | 9½ | (¹) | 2.5 | 20.7 | 52–55 | 5–10 |
| 15 | 1 | Sulphur trioxide 1 part | 2¾ | 1.6 | 2.5 | 19 | 67.5–69 | 5 |
| 16 | 1 | β-naphthalene sulphonic acid 1 part | 2¼ | 1.2 | 7.5 | 14.9 | 60–63 | 15 |

¹ Not measured.
NOTE.—The impurity level was estimated by examination of the infrared spectrum.

Comparison of Examples 3 and 4 with Examples 10 and 11 illustrates the advantage of using the phosphorus acids in order to reduce the yield of insoluble by-product.

Example 17

63.7 parts of o-chloraniline were added dropwise to a stirred solution of 49 parts of maleic anhydride in 216 parts of toluene and the mixture was stirred for 16 hours. Two parts of p-toluene sulphonic acid were then added and the mixture was stirred and refluxed for two hours in a Dean-Stark apparatus. At the end of that period 8 parts (about 90% of the theoretical amount) of water had collected. Seventeen parts of material insoluble in toluene were removed by filtration and excess 40–60° petroleum ether was added to the filtrate. The precipitated solid was found to be 90 parts of slightly impure N-o-chlorophenyl maleimide, having a melting point of 55–

56° C. The impure product was dissolved in benzene and the solution percolated through alumina to yield 84 parts of a product having a melting point of 65.5–66.5° C.

Similar results may be obtained from N-o-bromophenyl maleamic acid and N-p-fluorophenyl maleamic acid.

Example 18

25 parts of N-o-nitrophenyl maleamic acid and 108 parts of toluene were heated with reflux and stirred in a Dean-Stark apparatus for four hours together with one part of p-toluene sulphonic acid. At the end of this period 1.7 parts of water had been collected. Excess 60–80° petroleum ether was added to the mixture and the precipitated crude N-o-nitrophenyl maleimide was filtered off, washed with a saturated solution of sodium bicarbonate and dried in vacuo. The dried product was dissolved in benzene, percolated through alumina and precipitated again into petrol to yield 11.1 parts of N-o-nitrophenyl maleimide having a melting point of 131–132° C.

Similar results may be obtained from N-m-nitrophenyl and N-p-nitrophenyl maleamic acids.

Example 19

The preparative process of Example 18 was repeated using 25 parts of N-phenyl maleamic acid, 108 parts of xylene and one part of p-toluene suplonic acid. The heating was maintained for five hours after which time two parts of water had been collected. The yield after removal of insoluble by-products, precipitation into 60–80° petrol, filtration, cooling and drying was 12.6 parts of N-phenyl maleimide having a melting point of 88° C.

Similar results may be obtained from N-α-naphthyl, N-β-naphthyl, N-1-fluorenyl and N-4-fluorenyl maleamic acids, N-phenyl-2-chloromaleamic acid and N-phenyl citraconamic acid.

Example 20

The process of Example 19 was repeated using 125 parts of chlorobenzene in place of the xylene. The heating this time was maintained for seven hours and the yield was 15.5 parts of slightly impure N-phenyl maleimide having a melting point of 86.5° C.

Example 21

Twenty-five parts of N-butyl maleamic acid and 108 parts of xylene were stirred and heated under reflux in a Dean-Stark distillation apparatus in the presence of a trace of Topanol "0" as polymerisation inhibitor. After six hours, 1.8 parts of water had been collected. A further 100 parts of the amic acid and 260 parts of xylene were added and the refluxing continued for a further seven hours at the end of which a total of eight parts of water had been collected. The mixture was cooled and filtered to remove 17.4 parts of material insoluble in xylene. The xylene was then distilled from the filtrate under an absolute pressure of 30–40 mm. Hg and the residue was distilled off under an absolute pressure of 3–4 mm. Hg at 80–82° C. to yield 31 parts of impure N-butyl maleimide. The purity was identified by infrared analysis to be maleic anhydride and nitrogen analysis showed it to be present at 18% molar of the mixture.

Similar results were obtainable from N-ethyl, N-n-propyl, N-n-hexyl, N-cyclohexyl, N-n-dodecyl and N-4-chlorobutyl maleamic acids.

Example 22

One hundred parts of N-allyl maleamic acid and 430 parts of dry xylene were stirred together and heated under reflux in a Dean-Stark apparatus for five hours together with four parts of p-toluene sulphonic acid. 9.6 parts of water were collected. The xylene was then evaporated off under reduced pressure and the residue was distilled off under high vacuum to yield 29.5 parts of N-allyl maleimide having a melting point of 45° C.

Examples 23 to 31

A series of preparations of N-o-chlorophenyl maleimide were effected in a single step process from maleic anhydride and the amine as follows. 196 parts of maleic anhydride were dissolved in about 1700 parts of diluent in a flask. To this solution was added slowly a solution of 255 parts of o-chloroaniline in about 200 parts of diluent and the amic acid started to precipitate almost at once. The mixture was stirred gently at room temperature for about 22 hours. In Examples 23 and 24, at the end of this time the slurry of amic acid was treated with 16 parts of the chosen catalyst for the cyclisation reaction and this slurry was then added slowly to a refluxing solution of a further 16 parts of the catalyst in the solvent chosen for the amic acid formation process in a Dean-Stark distillation apparatus. In Examples 25 to 31, all the catalyst was added to the slurry of amic acid and the whole was refluxed in a Dean-Stark distillation apparatus. In Example 31, by way of comparison, no catalyst was used. At the end of the reaction (as gauged by observation of the amount of water formed) the reaction mixture was cooled, filtered to remove insoluble by-products and stirred with sodium bicarbonate to remove any acid residues. It was then refiltered, the solvent evaporated under vacuum and the residue distilled off under vacuum to obtain the pure imide.

The conditions and results of each preparation are tabulated below.

| Experiment | Diluent | Catalyst | Distillation time, hours | Yield (percent of theoretical) |
| --- | --- | --- | --- | --- |
| 23 | Xylene | 65% fuming sulphuric acid | 6 | 66.8 |
| 24 | do | Chlorosulphonic acid | 6 | 70.8 |
| 25 | do | Pyrophosphoric acid | 6½ | 75.7 |
| 26 | do | Polyphosphoric acid | 6 | 73.2 |
| 27 | do | Benzene phosphonic acid | 6½ | Ca. 70 |
| 28 | Toluene | Benzene phosphonic acid [1] | 6 | 53.5 |
| 29 | Xylene | Benzene phosphinic acid | 6½ | Ca. 70 |
| 30 | do | Orthophosphoric acid (88%) | 7 | 71.6 |
| 31 | do | None | 13 | 33 |

[1] Only 16 gms. of catalyst used.

Example 32

The process of Example 23 was repeated but the catalyst and all the amic acid were heated from the start of the cyclisation reaction, with no further addition of amic acid. The yield was only 61.9% of o-chlorophenyl maleimide and it was less pure, as indicated by a deeper yellow hue.

Examples 33 to 46

A further series of experiments were effected as follows. 196 parts of maleic anhydride were dissolved in about 1700 parts of diluent in a flask. To this solution was added slowly a solution of 255 parts of o-chloroaniline in about 200 parts of diluent and the amic acid started to precipitate almost at once. The mixture was stirred gently at room temperature for about 22 hours.

In most of the examples, the slurry of amic acid so obtained was then treated with a specified amount of acid catalyst and refluxed in a Dean-Stark distillation apparatus. In Example 44, however, the amic acid slurry was added slowly to a refluxing mixture of diluent and catalyst and in Examples 45 and 46 a mixture of the amic acid slurry and half the specified amount of catalyst was added slowly to a refluxing mixture of the remaining catalyst and diluent. The conditions and results of each experiment are tabulated below.

Example 47

200 parts of o-chlorophenylmaleamic acid were heated with 8 parts of p-toluene sulphonic acid under an atmosphere of nitrogen and in a distillation apparatus for four hours at 150–160° C. At the end of this period, the reaction mixture was extracted with 660 parts of benzene and the insoluble material (36.4 parts) filtered off. The benzene solution was then stirred with 50 parts of sodium bicarbonate to neutralise residual acid and the benzene evaporated off. The residue was then distilled to yield 84.4 parts (46.25% of theoretical) of o-chlorophenyl-maleimide.

Comparison of this example with the previous examples using a diluent indicates the high ratio of yield of insoluble material to the yield of imide that is obtained when operating in the absence of diluent.

By way of comparison, the process was repeated under identical conditions but omitting the catalyst. In this case the yield of benzene-insoluble material was 28.5 parts and the yield of imide only 51.1 parts (28.2% of theoretical).

When all the 2-chloroaniline solution had been added (390 minutes from the start), the mixture was heated under reflux for about 570 minutes longer and was then allowed to cool overnight. There was virtually no insoluble by-product. The solution was decanted from the catalyst and evaporated under nitrogen. The residue (408 g.) was distilled in vacuum to yield N-2-chlorophenyl-maleimide (348 g.; 85% yield), B.P. 137–144° C. at 0.9 torr.

In the course of this reaction the amount of N-2-chlorophenylmaleamic acid present was not more than 0.38 mole at 60 minutes from the start (0.47 mole of 2-chloroaniline added; 0.09 mole of water already formed), and after 360 minutes, only 0.41 mole of water was subsequently formed. These figures indicate that the concentration of N-2-chlorophenylmaleamic acid throughout the reaction did not significantly exceed 0.4 mole, in a total reaction volume that was initially about 2.3 dm.$^3$ of liquid and ultimately about 2.5 dm.$^3$.

Example 49

Maleic anhydride (196 g., 2 moles) was dissolved in xylene (2 dm.$^3$). Pyrophosphoric acid (32 g.) was added

| Example | Diluent | Catalyst | Time (hours) | Amount Insoluble by-product (parts) | Amount of water collected (Theory = 36 parts) | N-o-chlorophenyl maleimide Yield, percent | Appearance |
|---|---|---|---|---|---|---|---|
| 33 | Toluene | p-Toluene sulphonic acid 21 parts. | CA 5 | 61.7 | 30 parts | 67.5 | Yellow. |
| 34 | do | p-Toluene sulphonic acid 16 parts. | CA 4 | 65.2 | do | 62.6 | Do. |
| 35 | Dry toluene | do | 3 | 64 | 27 parts | 67.6 | Do. |
| 36 | Xylene | do | 5 | 86.3 | 30 parts | 62.6 | Do. |
| 37 | Dry toluene | p-Toluene sulphonic acid 16 parts EtOH 40 parts. | 6 | 54.7 | 63 parts (EtOH +H$_2$O) | 73.6 | Do. |
| 38 [1] | do | SO$_3$ 16 parts | 2½ | 50.3 | 26 parts | 74.7 | Very pale yellow. |
| 39 | do | 65% fuming sulphuric acid 16 parts. | 4½ | 85 | 30 parts | 73.1 | Do. |
| 40 | do | 65% fuming sulphuric acid 32 parts. | 5 | ([3]) | 31 parts | 75 | Do. |
| 41 | do | Sulphonated toluene [2] | 4 | 77.6 | 30 parts | 69.4 | Do. |
| 42 | Dry trichloroethylene | Dry p-toluene sulphonic acid 16 parts. | 6¾ | 101 | 26.5 parts | 64.8 | Do. |
| 43 | Methyl isobutyl ketone | p-Toluene sulphonic acid 16 parts. | 3½ | 19.7 | 35 parts | 61.3 | Deep yellow. |
| 44 | Dry xylene | do | 4 | 36.7 | do | 74.4 | Very pale elllow. |
| 45 | Dry toluene | p-Toluene sulphonic acid 32 parts. | 6¾ | 68.7 | 30 parts | 69.2 | Do. |
| 46 | Dry xylene | do | CA 5½ | 39.8 | 37 parts | 76.7 | Do. |

[1] Only 400 parts of amic acid were used in the cyclisation reaction in this experiment.  [2] Prepared by adding 16 parts of 65% fuming sulphuric acid to 86.7 parts of toluene.  [3] Not measured.

Example 48

Maleic anhydride (196 g., 2 moles) was dissolved in sodium-dried tolune (2 dm.$^3$). Pyrophosphoric acid (32 g.) was added and the mixture was heated under reflux with stirring in an apparatus with a Dean and Stark attachment. A solution of 2-chloroaniline (213 cm.$^3$, 2 moles) in toluene (213 cm.$^3$) was then added at the rate of approximately 12 cm.$^3$/cm.$^3$ of water formed, as shown in the following table, where the time is in minutes, and the water and reagent solution are in cm.$^3$.

| Time | Water | Reagent solution | Time | Water | Reagent solution |
|---|---|---|---|---|---|
| 0 | 0 | 0 | 210 | 15.3 | 260 |
| 10 | 0 | 48 | 225 | 16.6 | 275 |
| 20 | 0 | 60 | 245 | 18.1 | 290 |
| 30 | 0 | 70 | 255 | 18.9 | 305 |
| 40 | <0.5 | 80 | 270 | 20.0 | 320 |
| 50 | <1.0 | 90 | 285 | 21.1 | 335 |
| 60 | 1.6 | 100 | 300 | 22.0 | 345 |
| 70 | 2.6 | 110 | 315 | 23.0 | 360 |
| 80 | 3.4 | 125 | 330 | 23.8 | 380 |
| 90 | 4.5 | 135 | 345 | 24.6 | 395 |
| 100 | 5.3 | 145 | 360 | 25.3 | 416 |
| 110 | 6.3 | 160 | 390 | 26.2 | 426 |
| 120 | 7.3 | 170 | 450 | 28.2 | 426 |
| 135 | 8.4 | 185 | 480 | 28.8 | 426 |
| 150 | 9.7 | 200 | 570 | 29.7 | 426 |
| 165 | 11.2 | 215 | 810 | 31.6 | 426 |
| 180 | 12.6 | 230 | 1,290 | 32.7 | 426 |
| 195 | 14.0 | 245 | | | | and the mixture was heated under reflux with stirring in an apparatus with a Dean and Stark attachment. A solution of 2-chloroaniline (213 cm.$^3$, 2 moles) in xylene (213 cm.$^3$) was then added as shown in the following table, where the time is in minutes and the water and reagent solution are in cm.$^3$.

| Time | Water | Reagent solution | Time | Water | Reagent solution |
|---|---|---|---|---|---|
| 0 | 0 | 48 | 95 | 18.2 | 210 |
| 10 | 0 | 48 | 100 | 19.2 | 220 |
| 15 | 1.4 | 60 | 105 | 20.1 | 230 |
| 20 | 2.6 | 70 | 110 | 20.9 | 240 |
| 25 | 4.1 | 70 | 115 | 21.7 | 250 |
| 30 | 5.1 | 80 | 120 | 22.9 | 260 |
| 35 | 6.0 | 90 | 125 | 23.8 | 280 |
| 40 | 7.1 | 100 | 130 | 24.8 | 290 |
| 45 | 7.9 | 110 | 135 | 25.6 | 300 |
| 50 | 9.0 | 120 | 140 | 26.3 | 310 |
| 55 | 10.0 | 130 | 145 | 27.4 | 320 |
| 60 | 10.8 | 140 | 150 | 27.7 | 330 |
| 65 | 11.7 | 150 | 160 | 29.2 | 350 |
| 70 | 12.9 | 160 | 170 | 30.0 | 370 |
| 75 | 13.8 | 170 | 180 | 31.1 | 390 |
| 80 | 14.9 | 180 | 190 | 32.3 | 410 |
| 85 | 16.1 | 190 | 200 | 33.5 | 416 |
| 90 | 17.1 | 200 | 210 | 34.1 | 426 |

When all the 2-chloroaniline had been added, the reaction mixture was heated under reflux for ten minutes further and then the liquid was decanted from the catalyst. It was evaporated to dryness under nitrogen and the residue (364 g.) was distilled in vacuum to yield N-2-chlorophenylmaleimide (314 g.; 77% yield).

In the course of this reaction the amount of N-2-chlorophenylmaleamic acid present was not more than 0.23 mole (at 10 minutes from the start) in a volume of about 2.3 dm.³, and thereafter gradually fell, the periodic additions of 2-chloroaniline being rather less (mole for mole) than the amounts of water distilled off.

Example 50

Maleic anhydride (196 g.; 2 moles) was dissolved in sodium-dried xylene (1 dm.³) and ortho phosphoric acid (32 g.) added. The mixture was stirred at 100 revolutions/minute and heated under reflux as in Example 48, and 2-chloroaniline (213 cm.³) in xylene (213 cm.³) was added at the rate of dehydration as shown in the following table, where the time is in minutes and the quantities of water and reagent solution are in cm.³.

| Time | Water | Reagent solution | Time | Water | Reagent solution |
|---|---|---|---|---|---|
| 0 | 2.0 | 26 | 170 | 22.6 | 236 |
| 5 | 2.5 | 36 | 175 | 22.9 | 246 |
| 10 | 2.6 | 46 | 180 | 23.3 | 256 |
| 15 | 3.1 | 56 | 185 | 23.7 | 266 |
| 20 | 3.4 | 66 | 190 | 24.0 | 276 |
| 25 | 3.9 | 76 | 195 | 24.7 | 286 |
| 30 | 4.3 | 86 | 200 | 25.4 | 296 |
| 35 | 4.6 | 96 | 205 | 25.7 | 306 |
| 40 | 5.1 | 106 | 210 | 26.4 | 316 |
| 45 | 6.0 | 116 | 215 | 26.9 | 326 |
| 50 | 7.4 | 126 | 220 | 27.4 | 336 |
| 55 | 9.0 | 136 | 225 | 28.1 | 346 |
| 60 | 10.5 | 146 | 230 | 28.6 | 356 |
| 65 | 11.5 | 156 | 235 | 29.2 | 366 |
| 70 | 12.7 | 166 | 240 | 29.6 | 376 |
| 75 | 13.6 | 176 | 245 | 30.5 | 386 |
| 80 | 14.7 | 186 | 250 | 31.0 | 396 |
| 85 | 15.5 | 196 | 255 | 31.4 | 406 |
| 90 | 16.6 | 206 | 260 | 31.7 | 416 |
| 160 | 22.3 | 216 | 265 | 32.1 | 426 |
| 165 | 22.5 | 226 | 360 | 36.5 | 426 |

When the reaction was complete, the solution was decanted from the catalyst while hot and allowed to cool. The mixture was filtered free from insoluble matter and the filtrate evaporated off under nitrogen leaving a residue (386.8 g.) which was distilled in vacuum to yield N-2-chlorophenylmaleimide (296.8 g.; 71.5%), B.P. 130–135° C. at 0.5 torr (non-volatile residues 75.0 g.).

Example 51

Maleic anhydride (205.8 g.; 2.1 moles) was dissolved in tetrachloroethylene (1 dm.³). Orthophosphoric acid (18.5 cm.³) was added, and the mixture heated under reflux with stirring in an apparatus fitted with a Dean and Stark attachment. A solution of 2-chloroaniline (213 cm.³; 2 moles) in tetrachloroethylene (213 cm.³) was added at the rate of dehydration as shown in the table below where the time is in minutes, and the water and reagent quantities are in cm.³.

| Time | Water | Reagent solution | Time | Water | Reagent solution |
|---|---|---|---|---|---|
| 0 | 0 | 0 | 85 | 30.5 | 180 |
| 5 | 4.0 | 20 | 90 | 32.2 | 190 |
| 10 | 6.2 | 30 | 95 | 34.0 | 200 |
| 15 | 6.8 | 40 | 100 | 36.2 | 210 |
| 20 | 7.5 | 50 | 105 | 38.0 | 220 |
| 25 | 8.0 | 60 | 110 | 40.0 | 230 |
| 30 | 8.5 | 70 | 125 | 42.0 | 300 |
| 35 | 9.5 | 80 | 170 | 42.5 | 360 |
| 40 | 10.5 | 90 | 175 | 43.0 | 370 |
| 45 | 12.0 | 100 | 190 | 44.5 | 380 |
| 50 | 14.0 | 110 | 205 | 45.3 | 390 |
| 55 | 16.0 | 120 | 210 | 45.6 | 400 |
| 60 | 19.0 | 130 | 225 | 45.7 | 426 |
| 65 | 20.5 | 140 | 255 | 46.6 | 426 |
| 70 | 24.0 | 150 | 300 | 47.8 | 426 |
| 75 | 27.0 | 160 | | | |

After 300 minutes the solution was decanted from the catalyst while hot. On cooling, crystals of N-2-chlorophenylmaleimide separated out; these were filtered off and dried at a pressure of 0.5 torr at 50–60° C. The yield was 211.5 g.

The remaining solution was evaporated under nitrogen leaving 151.7 g. of solid. This was distilled under a pressure of 0.8–1.0 torr, and the fraction boiling at 128–134° C. was collected, the yield being 105.7 g. and the residue was 30.6 g.

Total yield was 317.2 g. (76.4%) N-2-chlorophenylmaleimide.

Example 52

Maleic anhydride (196 g.; 2 moles) was dissolved with p-toluenesulphonic acid (32 g.) in xylene (2 dm.³), the mixture stirred (100 revolutions/minute) and heated under reflux in an apparatus having a Dean and Stark attachment until 4.0 cm.³ water were evolved. A solution of 2-chloroaniline (213 cm.³, 2 moles) in xylene (213 cm.³) was then added at the rate shown below, where the time is in minutes, and the water and 2-chloroaniline solution ("2–CA/xylene") are in cm.³.

| Time | Water | 2-CA/xylene | Time | Water | 2-CA/xylene |
|---|---|---|---|---|---|
| 0 | 0 | 15 | 80 | 24.3 | 255 |
| 5 | 1.0 | 30 | 85 | 25.6 | 270 |
| 10 | 2.5 | 45 | 90 | 26.8 | 285 |
| 15 | 3.9 | 60 | 95 | 28.1 | 300 |
| 20 | 5.5 | 75 | 100 | 29.6 | 315 |
| 25 | 7.0 | 90 | 105 | 30.9 | 330 |
| 30 | 8.5 | 105 | 110 | 32.0 | 345 |
| 35 | 10.5 | 120 | 115 | 33.2 | 360 |
| 40 | 12.0 | 135 | 120 | 34.4 | 375 |
| 45 | 13.5 | 150 | 125 | 35.4 | 390 |
| 50 | 15.0 | 165 | 130 | 36.2 | 405 |
| 55 | 16.5 | 180 | 135 | 37.1 | 426 |
| 60 | 18.2 | 195 | 140 | 38.0 | 426 |
| 65 | 19.8 | 210 | 155 | 39.1 | 426 |
| 70 | 21.3 | 225 | 185 | 39.7 | 426 |
| 75 | 23.0 | 240 | | | |

After 185 minutes the solution was allowed to cool and the insoluble by-product (10.4 g.) filtered off. The filtrate was evaporated in vacuum under nitrogen and the residue (474.1 g.) distilled at about 135° C. at 1.5 torr to give N-2-chlorophenylmaleimide (345.5 g.; 83.2%) and non-volatile residue (66.3 g.).

Example 53

The reaction was carried out using an apparatus as shown in FIGURE 1, comprising a vessel 1 partially divided into a reaction chamber 2 and an effluent chamber 3 connecting with a product outlet 4. The partition left a small clearance at the bottom of the vessel to allow passage of liquid, and had vents 5 to allow equilibration of vapour.

A liquid mixture in the reaction chamber containing catalyst and diluent was heated under reflux by radiant strip heaters 6, and stirred by a stirrer 7 (a helically twisted strip secured to a shaft). Vapour escaped through the outlet 8 to be condensed and separated in a Dean and Stark apparatus (not shown). Acid anhydride and primary amine were separately supplied into the top of the reaction chamber through inlets 9 and 10 at a controlled rate by means of automatic filling pipettes.

Orthophosphoric acid (80 cm.³) and xylene (300 cm³) were heated under reflux in the reaction chamber until no water was evolved. Then heating was continued while a solution of 2-chloroaniline (213 cm.³; 2.0 moles) in xylene (213 cm.³) was added at the rate of 1.2 cm.³ every minute, and a solution of maleic anhydride (196 g; 2.0 moles) in xylene (2000 cm.³) kept at 90–110° was likewise added at the rate of 5.55 cm.³ every minute. A solution of N-2-chlorophenylmaleimide was obtained through the outlet from the effluent chamber. The amount of water condensed in the Dean and Stark apparatus (indicating the amount of the imide formed) during the course of the reaction is shown in the following table where the time is in minutes from the initial addition of the reagents and the water is in cm.³.

| Time | Water | Time | Water | Time | Water |
|---|---|---|---|---|---|
| 0 | 0 | 80 | 7.6 | 160 | 14.5 |
| 5 | 0.6 | 85 | 8.1 | 165 | 14.8 |
| 10 | 1.0 | 90 | 8.6 | 170 | 15.3 |
| 15 | 1.3 | 95 | 9.1 | 175 | 15.9 |
| 20 | 1.7 | 100 | 9.6 | 180 | 16.3 |
| 25 | 1.9 | 105 | 10.0 | 185 | 16.7 |
| 30 | 2.2 | 110 | 10.5 | 190 | 16.8 |
| 35 | 2.8 | 115 | 10.9 | 195 | 17.1 |
| 40 | 3.6 | 120 | 11.3 | 200 | 17.5 |
| 45 | 4.1 | 125 | 11.7 | 205 | 18.0 |
| 50 | 4.7 | 130 | 12.0 | 210 | 18.4 |
| 55 | 5.3 | 135 | 12.4 | 215 | 19.6 |
| 60 | 5.8 | 140 | 12.8 | 220 | 20.1 |
| 65 | 6.3 | 145 | 13.4 | 225 | 20.6 |
| 70 | 6.7 | 150 | 13.8 | 230 | 21.2 |
| 75 | 7.1 | 155 | 14.2 | 235 | 21.7 |
|  |  |  |  | 240 | 22.1 |

After 240 minutes, when two thirds of the reactions had been added, the solution of the product that had been collected was filtered and evaporated and the residue (201.6 g.) distilled at 136° C. at 2 torr to give N-2-chlorophenylmaleimide (170 g., 59.2% yield from 2-chloroaniline) and non-volatile residue (29 g.).

Example 54

The reaction was carried out as described in Example 53. Orthophosphoric acid (80 cm.³) and xylene (250 cm.³) were heated under reflux until no water was evolved, and heating was then continued while a solution of 2-chloroaniline (213 cm.³; 2.0 moles) in xylene (213 cm.³) was added at the rate of 1.2 cm.³ every minute and a solution of maleic anhydride (215.6 g; 2.2 moles) in xylene (2000 cm.³) kept at 90–110° C. was added at the rate of 5.55 cm.³ every minute. When 2.0 moles of 2-chloroaniline had been added, however, only 1.91 moles of maleic anhydride had been used because allowance had not been made for thermal expansion of the maleic anhydride solution. The amount of water collected during the course of the reaction is shown in the following table, where the time is in minutes from the initial addition of the reagents and the water is in cm.³.

| Time | Water | Time | Water |
|---|---|---|---|
| 0 | 0 | 180 | 16.0 |
| 30 | 2.5 | 210 | 18.7 |
| 60 | 4.8 | 240 | 21.4 |
| 90 | 8.0 | 270 | 24.0 |
| 120 | 11.0 | 300 | 26.7 |
| 150 | 13.5 | 330 | 27.4 |

After 330 minutes the solution of the product that had been collected was filtered and evaporated and the residue (364.8 g.) distilled at 141 to 161° C. at 1 to 4 torr to give N-2-chlorophenylmaleimide (260.0 g.; 68.7% yield from 1.91 moles of maleic anhydride) and non-volatile residue (74.2 g.).

Example 55

The reaction was carried out as described in Example 54, except that the solution of 2-chloroaniline was injected at the rate of 1.2 cm.³ every minute and the solution of maleic anhydride was injected at the rate of 6.4 cm.³ every minute (i.e. volume compensated for thermal expansion). The amount of water collected (cm.³) during the course of the reaction (time in minutes from the initial addition of the reagents) is shown in the following table.

| Time | Water | Time | Water |
|---|---|---|---|
| 0 | 0 | 120 | 8.5 |
| 30 | 1.3 | 150 | 11.3 |
| 60 | 3.2 | 180 | 13.2 |
| 90 | 5.8 | 210 | 15.1 |
|  |  | 240 | 16.4 |

After 240 minutes, when 1.0 mole of 2-chloroaniline had been added, the solution of the product that had been collected was filtered and evaporated and the residue (177.5 g.) distilled at 133 to 141° C. at about 1 torr to give N-2-chlorophenylmaleimide (156.8 g.; 75.5% yield) and non-volatile residue (15.0 g.).

Example 56

Maleic anhydride (196 g.; 2.0 moles) and xylene (2 dm.³) with sulphuric acid (32 g.; s.g. 1.84) were heated under reflux with stirring (100 r.p.m.) in a Dean and Stark apparatus and the water present initially (about 6 cm.³) was removed. 2-chloroaniline (213 cm.³; 2.0 moles) was then added in stages and the volume of water distilled off was measured as shown in the following table where the time is in minutes, and the quantities of water and reagent solution are in cm.³.

| Time | Water | Reagent solution | Time | Water | Reagent solution |
|---|---|---|---|---|---|
| 0 | 0 | 15 | 80 | 23.6 | 260 |
| 5 | 1.0 | 25 | 85 | 25.0 | 275 |
| 10 | 2.1 | 40 | 90 | 26.5 | 290 |
| 15 | 3.5 | 55 | 95 | 27.6 | 305 |
| 20 | 4.7 | 70 | 100 | 29.0 | 320 |
| 25 | 6.5 | 85 | 105 | 30.5 | 335 |
| 30 | 7.9 | 100 | 110 | 31.7 | 350 |
| 35 | 9.0 | 115 | 115 | 32.3 | 365 |
| 40 | 10.7 | 130 | 120 | 33.5 | 380 |
| 45 | 12.4 | 145 | 125 | 34.5 | 395 |
| 50 | 14.0 | 160 | 130 | 35.2 | 410 |
| 55 | 15.5 | 175 | 135 | 36.2 | 426 |
| 60 | 16.8 | 190 | 140 | 36.5 | 426 |
| 65 | 18.5 | 215 | 175 | 38.05 | 426 |
| 70 | 20.4 | 230 | 180 | 38.1 | 426 |
| 75 | 22.2 | 245 |  |  |  |

After 180 minutes the mixture was allowed to cool and the insoluble by-products (2.4 g.) filtered off. The filtrate was evaporated under nitrogen and the residue (416.8 g.) distilled in vacuum to yield N-2-chlorophenyl maleimide (304 g.; 73.4%), B.P. 125 to 134° C. at 0.25 to 0.6 torr, and 134 to 142° C. at 0.6 to 0.7 torr (non-volatile residue 104.3 g.).

I claim:

1. A process for the preparation of an imide in which an anhydride of an $\alpha,\beta$-ethylenically unsaturated cis-$\alpha$-$\beta$-dicarboxylic acid which is free from atomic groups which are basic in character, is treated with a primary amine of the structure Z-$NH_2$ where Z is non-basic in character and is linked to the amino nitrogen atom by a carbon-nitrogen bond, in an excess of an inert organic diluent having a boiling point between 80 and 180° C., and the amic acid so formed is cyclised in situ by contacting the amic acid at a temperature between 80 and 180° C. with an acidic catalyst selected from the group consisting of sulphur trioxide, sulphuric acid, chlorosulphonic acid, polyphosphoric acids, pyrophosphoric acid, phosphorus acids having the structure HOPO, $HOPO_2$, $(HO)_3P$, $(HO)_3PO$, $HP(OH)_2$, $HPO(OH)_2$, $H_2POH$ and $H_2PO \cdot OH$ organic sulphonic acids and organo-phosphorus acids, the amounts of catalyst employed being 0.01 to 5% by weight of the diluent, and the water formed during the cyclisation is distilled off as the reaction proceeds.

2. A process according to claim 1 in which the primary amine is added to the reaction mixture containing the acid anhydride, at approximately the rate (mole for mole) that water produced in the cyclisation is distilled off.

3. A process according to claim 2 in which the acid anhydride and primary amine are each added to the reaction mixture at approximately the rate (mole for mole) that water produced in the cyclisation is distilled off.

4. A process according to claim 1 in which the anhydride is maleic anhydride.

5. A process according to claim 1 in which the amine is 2-chloroaniline.

6. A process according to claim 1 in which the catalyst is an inorganic phosphorus-containing acid.

7. A continuous process according to claim 3 using a soluble catalyst, in which the catalyst is added to the reaction mixture at the rate required to maintain the catalyst concentration in the reaction mixture approximately constant.

References Cited

UNITED STATES PATENTS

| 2,205,558 | 6/1940 | Flett | 260—326.5 |
| 2,669,555 | 2/1954 | Giammaria | 260—326.5 |
| 3,148,196 | 5/1962 | Ladd | 260—326.5 |

NICHOLAS S. RIZZO, *Primary Examiner.*

JOSE TOVAR, *Assistant Examiner.*